P. E. JAY.

Process of Making Cast Iron from Ore.

No. 134,289. Patented Dec. 24, 1872.

Witnesses:
G. Mathius
A. W. Cart

Inventor:
Pierre Eymard Jay
per
Attorneys.

UNITED STATES PATENT OFFICE.

PIERRE EYMARD JAY, OF ST. JEAN BAPTISTE, CANADA.

IMPROVEMENT IN THE PROCESSES OF MAKING CAST-IRON FROM ORE.

Specification forming part of Letters Patent No. 134,289, dated December 24, 1872.

CASE B.

*To all whom it may concern:*

Be it known that I, PIERRE EYMARD JAY, of St. Jean Baptiste, in the county of Hochelaga, in the Province of Quebec, Dominion of Canada, have invented a new and useful Improvement on the Process of Making Cast-Iron from Ore; and I do hereby declare that the following is a full, clear, and exact description of the same.

The first part of my invention relates to the combination of slag—being the residue of the burning of cast-iron with oxide of manganese, nitrate of soda, and oxide of iron—with iron ore placed in a furnace to be converted, by heating, into cast-iron. The second part of my invention relates to the employment of an air-blast pipe connected with the upper part of the furnace so as to blow down on the liquid metal the gases arising from the ore, and also exert a certain degree of atmospheric pressure on the metal.

Figure 1:
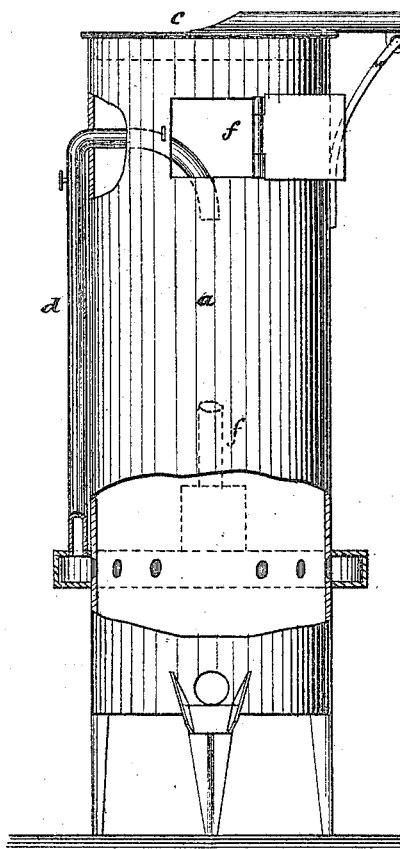
Figure 2:
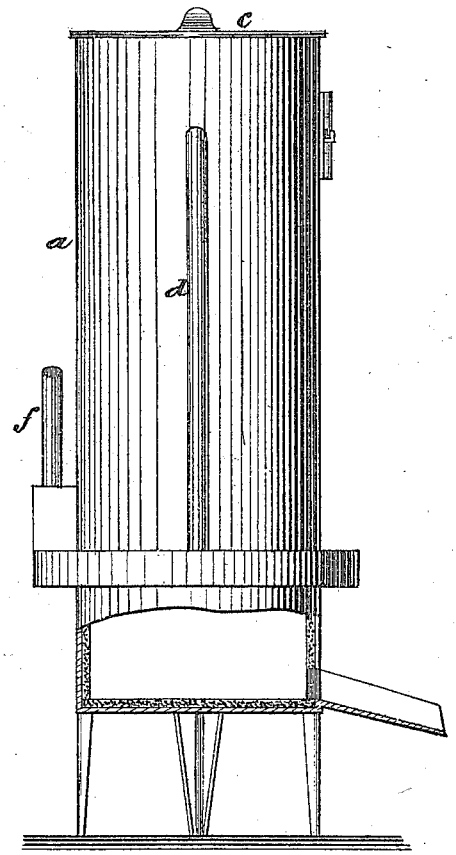

In the drawing, Figures 1 and 2 are partly-sectional elevations of a furnace employed in carrying out my process.

The aforesaid slag is the residue of the burning of cast-iron with oxide of manganese, nitrate of soda, and oxide of iron in the proportions of ten parts of oxide of manganese, ten parts of nitrate of soda, and six parts of oxide of iron, as described in a patent issued to me of even date with this.

$a$ is the body of a cupola. $b$ is a door for introducing the slag and ore. $c$ is the hinged cover for closing the cupola at the top. $d$ is a pipe for admitting the air-blast in the upper part of the cupola. $f$ is the ordinary blast-pipe entering the cupola at the base.

The operation of converting iron ore into cast-iron according to my process is as follows: Place a charge of coal in the cupola $a$. Over the coal place a layer of slag. On top of this layer of slag place a charge of iron ore and cover it with a layer of slag. Then for every hundred pounds of iron ore which is in the cupola add fifty pounds of cast-iron. Thus the slag and ore are regularly stratified. As soon as the whole mass of metal which is in the cupola is brought to a red heat, close the cupola at the top by letting down the cover $c$. The carbon contained in the slag will then go through the ore, and the whole of the metal immediately becomes fused. At the beginning of the operation the blast of atmospheric air is forced through the pipe $f$ underneath the charge of coal in the cupola in order to ignite the coal. The air of the blast is subsequently directed, by means of a cock suitably placed, into the pipe $d$, so as to bring the current on top of the charge of metal in order to keep the gases arising from the fusion of the metal on the metal itself, and help more effectually the fusion of said metal. For accomplishing this the cupola is made air-tight by closing the cover $c$.

Having thus described my invention, what I claim as new, and desire to secure by Letters Patent, is—

1. The process of producing cast-iron from native ore by means of slag derived from treating melted cast-iron with oxide of manganese, nitrate of soda, and oxide of iron in the above-specified proportions, in the manner described.

2. The process of producing cast-iron from native ore by means of the slag above described and the employment of a blast of air delivered through a pipe, $d$, curved or bent downward within the cupola, so as to convey an air-current upon the surface of the metal subsequent to liquefaction.

3. In combination with the cupola $a$, the pipes $d$ and $f$ and a suitably-arranged cock for directing the air-blast, as set forth.

P. E. JAY.

Witnesses:
    THOS. D. D. OURAND,
    CHAS. A. PETTIT.